June 26, 1923.
T. BLANKENSHIP
NUT LOCK
Filed March 30, 1922
1,459,818
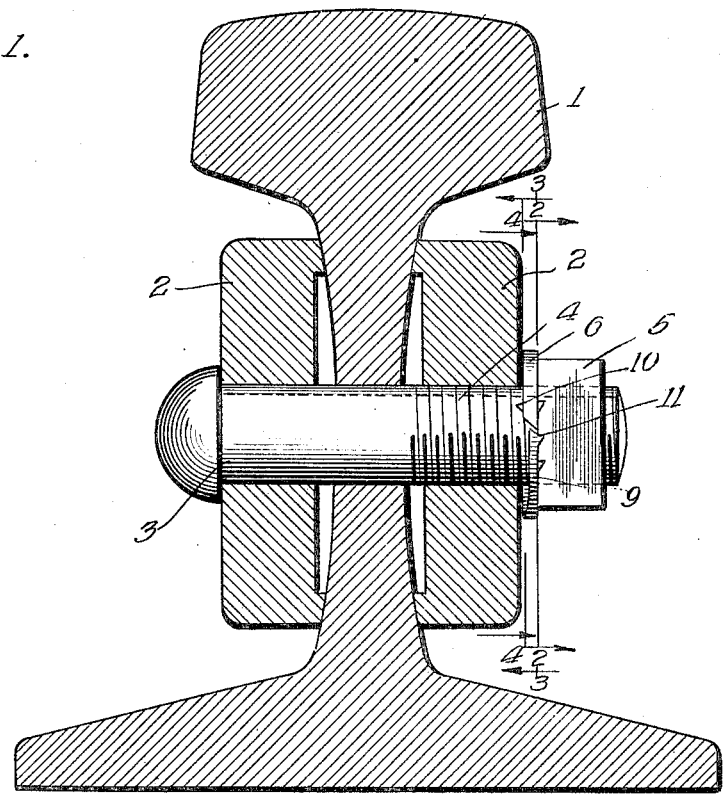

Patented June 26, 1923.

1,459,818

UNITED STATES PATENT OFFICE.

TONY BLANKENSHIP, OF KINCAID, ILLINOIS, ASSIGNOR OF ONE-HALF TO JOSEPH J. DAVIS, OF KINCAID, ILLINOIS.

NUT LOCK.

Application filed March 30, 1922. Serial No. 548,060.

*To all whom it may concern:*

Be it known that I, TONY BLANKENSHIP, a citizen of the United States, residing at Kincaid, in the county of Christian and State of Illinois, have invented certain new and useful Improvements in Nut Locks, of which the following is a description.

My invention relates to improvements in nut locks and has among its objects the production of a device of the kind described which is simple, convenient, compact, durable, reliable, efficient and satisfactory for use wherever found applicable. It also has as an object the production of a device of the kind described that may be employed as desired, but which may be released at any time and be again used as required. Many other objects and advantages of the construction herein shown and described will be obvious to those skilled in the art from the disclosure herein given.

To this end my invention consists in the novel construction, arrangement and combination of parts herein shown and described, and more particularly pointed out in the claim.

In the drawings, wherein like reference characters indicate like or corresponding parts;

Fig. 1 is a sectional view showing the device in place;

Fig. 2 is a sectional view taken substantially on the line 2—2 of Figure 1;

Fig. 3 is a sectional view taken substantially on the line 3—3 of Figure 1;

Fig. 4 is a sectional view taken substantially on the line 4—4 of Fig. 1; and

Fig. 5 is a side elevation of the locking washer.

For the purpose of illustrating my invention, I have shown the nut lock as used to hold fish plates in position on a rail, but it is to be understood that this showing is only illustrative of one use of my invention which may be applied to any other suitable use or structure wherein it is desired to lock a nut and bolt together against independent movement. 1 indicates a rail having the fish plates 2—2 on the opposite sides thereof. A bolt 3 extends through registering apertures in the rail and plates to hold the parts in position, the bolt being threaded at the end of its shank, as at 4. Threadedly engageable with the bolt is a nut 5, and intermediate to the nut and the work to be held, I have arranged a lock washer 6.

The washer 6 is preferably of a split ring construction, having its opposed ends at the split 8 bevelled so as to overlap. One of the ends of the washer is reduced in axial thickness, as at 9. One or more axially extending prongs or teeth 10 is formed or provided on the inner of the flat sides of the washer, and one or more teeth 11 is provided on the other or outer flat side of the washer, as shown, one of the teeth 11 arranged on the reduced portion 9 to project outwardly therefrom adjacent the split.

When the nut 5 is tightened up, the prong 10 bites into the plate 2 while the prong 11 bites into the nut 5 so that the nut is prevented from freely backing off the bolt. If desired, the inner face of the nut 5 is provided with radial recesses 7 engageable with the prong 11, the recesses 7 being so formed that they will freely ratchet or ride over the prong 11 when the nut is rotated clockwise, but will interengage or lock with said prong to prevent relative movement when it is attempted to rotate the nut in the opposite direction. Any desirable method of preventing the washer from rotating on the bolt may be employed, as for instance by providing the washer with a tongue 12 intermediate its split ends, slidable in a groove 13 provided in the bolt.

As has been heretofore pointed out, the portion 9 of the washer is of lesser axial thickness than the remainder of the washer. This is for the purpose of releasing the nut from the prong 11 in order to back off said nut when desired. A screwdriver or any other suitable or equivalent tool may be inserted between the ends of the washer at the split 8 to force the end 9 toward the work, in the direction indicated by the arrow in Figure 1, so that the tooth 11 will be held disengaged from the nut, thereby allowing the nut to be backed off.

Having thus described my invention, it is obvious that various immaterial modifications may be made in the same without departing from the spirit of my invention; hence I do not wish to be understood as lim- iting myself to the exact form, arrangement, construction and combination of parts herein shown and described or uses mentioned.

What I claim as new and desire to secure by Letters Patent is:

The combination with a threaded bolt, a nut threadedly engageable therewith, a split washer arranged on said bolt between the work and said nut, the major portion of said washer constituting the body thereof being of a substantial thickness and non-resilient, said washer having a beveled edge at the thickened side of the split therein and being reduced substantially in thickness from a point near the edge of the other side thereof to provide a resilient tongue at one end of the washer, said tongue along its edge having an upwardly projecting beveled surface extending across said edge and overlapping the beveled edge of the thickened side of the washer, said tongue also having an outstanding tooth projecting forwardly beyond one side of the washer to engage said nut, the side faces of said washer lying normally in a plane substantially parallel with the side of the nut and the surfaces to be engaged by said washer, whereby when the nut is tightened a gripping engagement is effected between the nut and the washer by said tooth without placing the thickened body portion of the washer under tension.

In testimony whereof, I have hereunto signed my name in the presence of two subscribing witnesses:

TONY BLANKENSHIP.

Witnesses:
 LEEFERN NEECE,
 O. O. BLOXAM.